United States Patent

[11] 3,559,689

| [72] | Inventors | Jack Dunbar<br>Davenport, Iowa;<br>Donald K. Schlueter, Northridge, Calif. |
|---|---|---|
| [21] | Appl. No. | 841,490 |
| [22] | Filed | July 14, 1969 |
| [45] | Patented | Feb. 2, 1971 |
| [73] | Assignee | The Bendix Corporation South Bend, Ind.<br>a corporation of Delaware |

[54] 20 MAN RAFT CO₂ INFLATION VALVE
10 Claims, 6 Drawing Figs.

[52] U.S. Cl. .................................................. 137/627.5,
137/636, 137/596.13, 137/596.2, 137/614.19,
137/614.2, 251/294, 137/553
[51] Int. Cl. ........................................................ F16k 11/10
[50] Field of Search.......................................... 137/627.5,
636, 636.4, 596.13, 596.1, 596.2, 614.19, 614.2,
553; 251/294

[56] References Cited
UNITED STATES PATENTS

| 1,245,809 | 11/1917 | Smirz .......................... | 137/636.1X |
| 2,523,906 | 9/1950 | Holmes ...................... | 137/627.5X |
| 3,308,850 | 3/1967 | Gill.............................. | 251/315X |

Primary Examiner—Clarence R. Gordon
Attorneys—William N. Antonis and Plante, Arens, Hartz, Hix & Smith ABSTRACT: The following relates to a fluid pressure distributing mechanism for inflating a life raft which permits automatic venting of the raft inflation chambers when the raft is in a noninflated state and includes a failsafe actuator arrangement for preventing inadvertent actuation of the mechanism. Automatic venting is provided through means of a tilt-type poppet valve, and failsafe actuation is provided through a cam controlled valve arrangement wherein the cam has an initial nonactuating range of rotation and a subsequent actuating range of rotation.

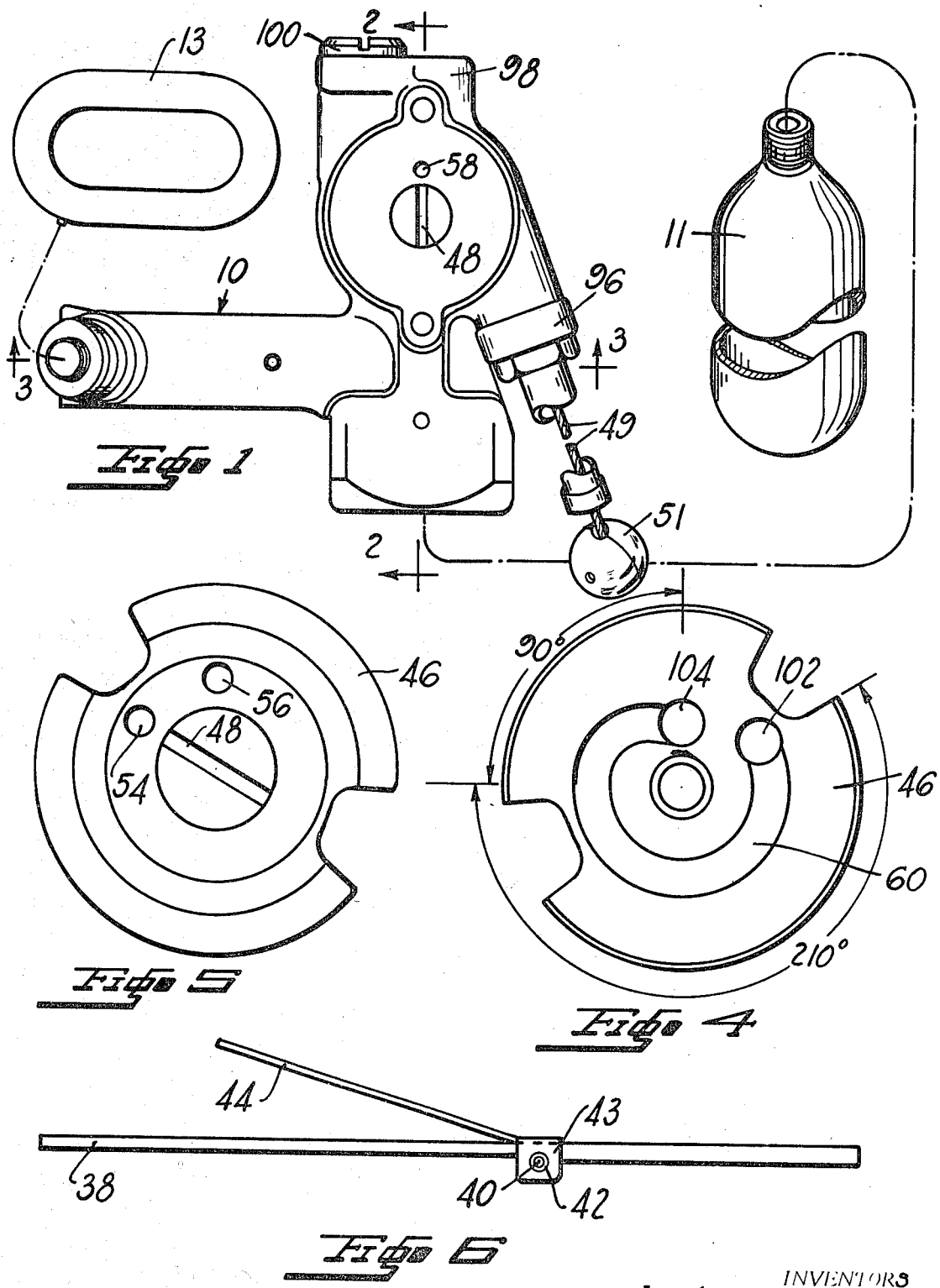

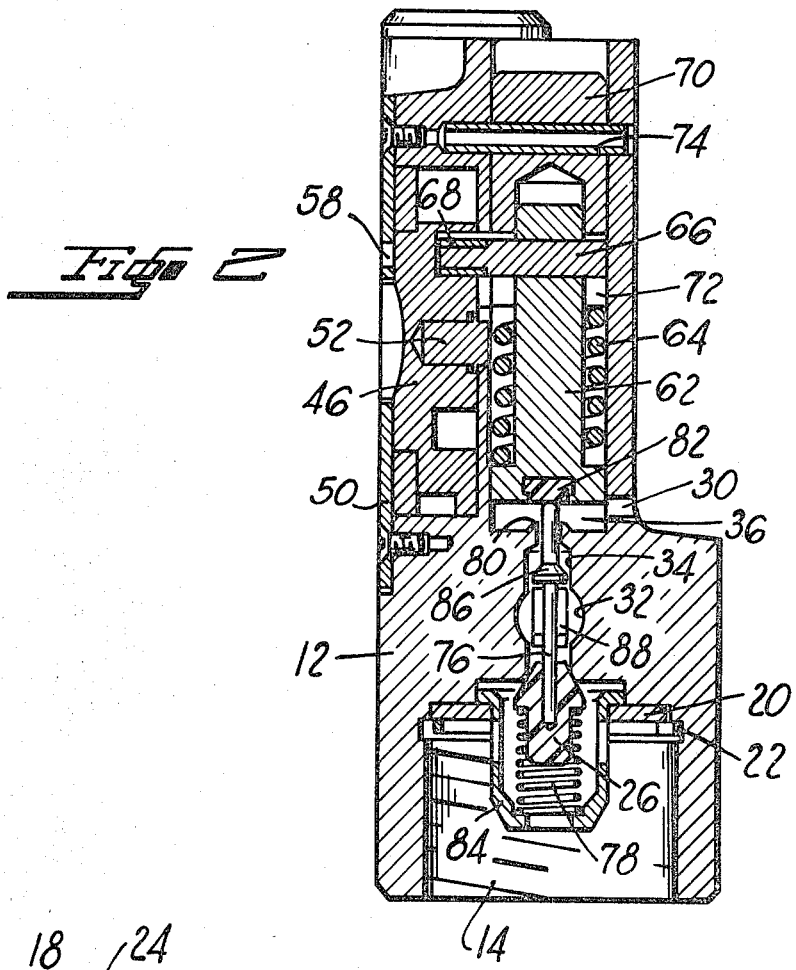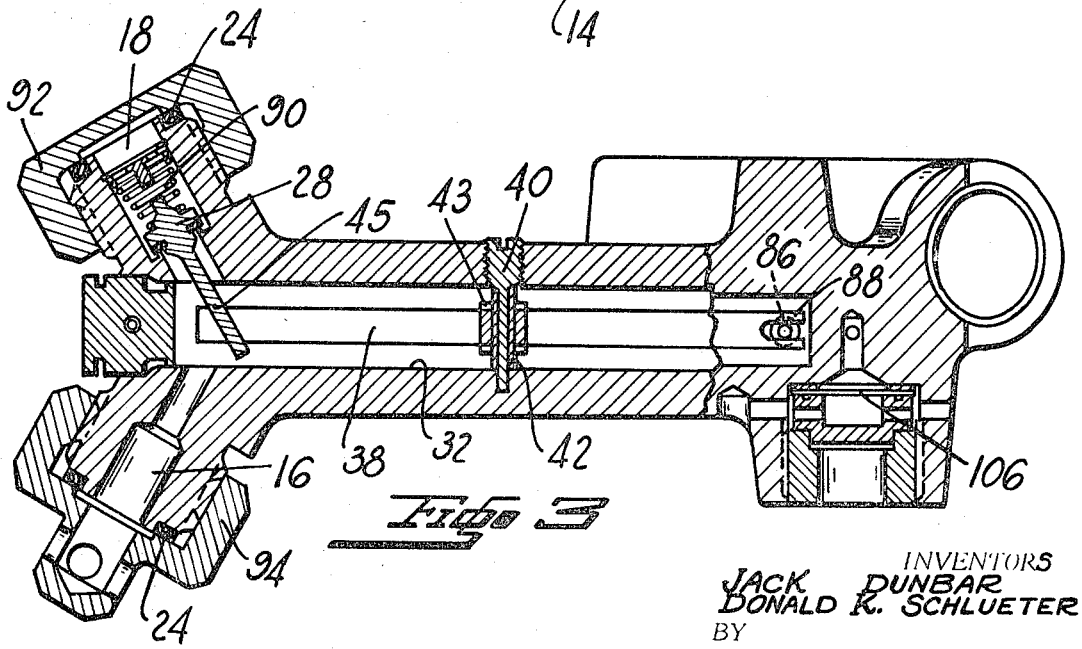

3,559,689

20 MAN RAFT $CO_2$ INFLATION VALVE

BACKGROUND OF THE INVENTION

Over the past several years, many accidents have occurred in aircraft which were caused by inadvertent inflation of life rafts mounted under the wing surface or other locations. Such accidents are extremely serious because the life raft and wing panel may, for example, strike the aircraft tail and disrupt control. The causes of such accidents are primarily due to the fact that such rafts are unable to "breathe" automatically with change in altitude and can inflate due to changes in ambient pressure which occur at different altitudes or are inflated due to vibrations which cause movement of the actuating mechanism. In some rafts, "breathing" is permitted if the vent valve is manually moved to an open position and is not subsequently caused to move to a closed position by vibrations.

SUMMARY OF THE INVENTION

Accordingly, it is an object of this invention to provide a fluid pressure distributing device for use in conjunction with the inflation system of a life raft which will eliminate inadvertent raft inflations.

Another object of this invention is to provide a fluid pressure distributing device which includes means for automatic venting of the raft inflation chambers when the raft is stored and is in a noninflated condition.

A further object of this invention is to provide a fluid pressure distributing device which includes a failsafe actuating mechanism which will not move to an actuating position when subjected to vibrations.

A still further object of this invention is to provide a fluid pressure distributing device which is smaller, lighter, and more positive acting than prior comparable devices.

The above and other objects and features of the invention will become apparent from the following description of the mechanism taken in connection with the accompanying drawings.

BRIEF DESCRIPTION OF THE DRAWINGS

FIG. 1 is a schematic view of the life raft inflating apparatus embodying the present invention and showing the relationship of the various operating and control elements thereof;

FIG. 2 is a sectional view taken substantially along line 2–2 of the fluid pressure distributing device of FIG. 1;

FIG. 3 is a sectional view taken substantially along the line 3–3 of the distributing device of FIG. 1;

FIG. 4 and 5 are plan views of the opposite faces of the actuating cam plate; and FIG. 6 is a plan view of a lever and spring assembly removed from the device.

DESCRIPTION OF THE PREFERRED EMBODIMENT

Referring to the drawings, it will be seen that the numeral 10 designates, generally, a raft inflation distributing device which can be mounted on a fluid storage container 11 having a suitable pressurized fluid medium therein, such as carbon dioxide. The function of the valve is to provide carbon dioxide to two separate inflation chambers (not shown) of a life raft 13. The distributing device includes a housing 12 having an inlet port 14 and two outlet ports 16 and 18. The inlet port is adapted to engage the end of the carbon dioxide container in such a manner that a pressure seal results when the cylinder end compresses the soft metal washer 20 against the valve housing. The sealing washer 20 is retained in place by a spring clip 22. The outlet ports 16 and 18 are each adapted to engage one of the separate life raft inflation chambers in such a manner that a pressure seal is created at these ports through means of nylon washers 24 which are compressed against suitable mating fittings.

Located within the valve housing is a main valve 26, which controls flow of pressurized carbon dioxide through the inlet port 14, and a failsafe check valve 28 which is located in one of the outlet ports 18 in order to prevent communication between the separate life raft inflation chambers. With such a check valve arrangement, if a leak occurs in one of the inflation chambers after raft inflation, pressurization of the other inflation chamber can still be maintained.

The valve housing also includes a port 30 for venting the mounted uninflated stored raft. This vent port is open to flow as long as the main valve 26 is in a closed position which prevents discharge of the carbon dioxide from the storage container. Venting of the raft inflation chambers in the uninflated stored condition is required in order to prevent inflation of the raft by trapped air during changes in ambient pressure which occur at different altitudes. Vent flow from outlet port 16 to vent port 30 will occur through bore 32, passage 34, and bore 36. The vent flow from outlet port 18 will occur through the same bores and passages except that it first passes around the check valve 28 which is tilted off its valve seat and is held open by a spring loaded lever 38 which is mounted to the housing through a pivot pin 40 and centering sleeve 42. A flat spring 44, which is suitably attached to the lever 38 through a bracket 43 formed at the end of and as an integral part of the spring, as shown in FIG. 6, contacts the wall of the bore 32 and forces the lever 38 against the valve stem 45 in a direction which will tilt the check valve sufficiently to permit free flow therethrough.

The assembly 10 is constructed so that it not only is capable of releasing pressurized carbon dioxide from the storage tank to inflate the life raft, but so that it is also capable of charging the storage tank while mounted thereon. In order to charge the tank it is necessary that the main valve 26 be opened. This is accomplished by rotating the cam 46 through means of a screw driver slot 48 formed on the cam or by pulling a remote cable 49 which can be attached to a ball 51 and wound around the outside of the cam. The cable 49 has a ball swaged to its end which engages a slot on the outer diameter of the cam 46. The cam which is secured in place by a cam cover plate 50, is pivotable about a pin 52, which is pressed into the valve housing 12. Two indicator spots, one of which 54 is green and the other of which 56 is red, as shown in FIG. 5, are sequentially visible through a peep hole 58 in the cover plate. When the green spot is visible through the hole 58, this indicates that the main valve 26 is in a closed position. When the red spot is visible through the peep hole, this indicates that the main valve is in an open position.

When the cam is rotated in a clockwise direction to its extreme position by means of the screw driver slot 48 or cable pull, a spiral eccentric groove 60 on the back side of the cam allows the release of spring loaded plunger 62 which is urged in a downward direction by spring 64. The plunger 62 is connected to the cam groove 60 through means of a crosspin 66 and can follower roller 68 located on the end thereof. A plug 70, which is located in the end of bore 32 includes a slot 72 for permitting travel of the connecting pin 66 in the direction of the spring loaded plunger. The plug is fixedly connected to the valve housing 12 through any suitable means, such as a locking pin 74.

A valve lift pin 76, which extends through passage 34, abuts the end of the spring loaded plunger 62 and the main valve 26 so that downward movement of the plunger will cause the main valve to become unseated and move to an open position by overcoming the upward force exerted by the seal spring 78 and fluid pressure from within storage vessel 11. Such downward movement of the plunger also results in closing off the vent passage in the housing upon contact with seat 80 by the seal insert 82 located in the end of the plunger. The seal spring 78, which tends to urge the main valve towards a closed position is contained within the inlet port by a cup-shaped retainer 84, which is trapped by the washer 20 and spring clip 22. Because of shoulder 86 on the valve lift pin 76, which abuts the forked end 88 of the lever 38, movement of the pin 76 in a downward direction will also depress the lever against its opposing flat spring 44 so that it no longer will be in contact with the stem 45 of the check valve 28. When this occurs the spring 90 will cause the check valve to be fully seated and in a pressure responsive closed position.

Before the storage tank is charged, the outlet port 18 is closed off by means of a cap 92 which is screwed onto the housing and into sealing engagement with the gasket 24. The storage tank can then be charged by attaching the other outlet port 16 to a suitable pressure source, at which time the pressurized fluid can enter the storage tank through the open main valve 26. When the storage tank is filled to the required weight, the control cam 46 is rotated in a counterclockwise direction through means of the external screw driver slot 48 until the cam has moved to its extreme position at which time the green indicator spot 54 will be visible through the peep hole 58. Such rotation of the cam will cause the plunger 62 to move in an upward direction because of the cross-pin 66 which rides on the cam follower roller 68 located in the spiral groove of the cam. As the plunger 62 retracts, the spring 78 will move the main valve 26 to its closed position and also move the valve lift pin 76 in an upward direction. This will release the spring loaded lever 38 and cause the check valve 28 to be tilted so as to permit venting through the distributor device. The filler port can then be capped by a nondirectional vented cap 94 which is provided so that if the main valve 26 is inadvertently actuated, the resulting flow will not cause a directional reaction movement of the valve and cylinder assembly. A high pressure rupture disc 106 is also provided as required on a distributor device of this type.

The actuation cable 49 with ball end 51 can be suitable attached to the valve assembly at either of threaded ports 96 or 98. A cap assembly 100 is inserted into the port which is not used. With the remote actuation cable installed and the distributing device attached to the filled $CO_2$ storage cylinder 11 and to the two inflation chambers of the life raft 13, the raft can be inflated by pulling the cable and causing rotation of the cam plate 46. It will be seen from FIGS. 2 and 4 that initially the cross-pin 66 is located in the detent hole 102 of the cam plate 46 and that rotation thereof through approximately the first 210° will not cause any downward movement of the plunger 62, since this portion of the groove is circular. In effect, this portion of the groove provides an initial predetermined nonactuating range of rotation for the cam plate. However, during the next 90° of rotation, the groove is eccentric and will cause the follower pin 66 to move the plunger 62 downward until the vent valve 82 seats on valve seat 80 at which time the pin will be located in detent hole 104. Movement of the plunger 62 will also cause the valve lift member 76 to unseat the main valve 26 and release the pressurized fluid from the container 11. Downward movement of the member 76 also causes shoulder 86 thereof to exert a force against the forked portion 86 of the lever 38 to thereby cause the lever to pivot about pin 40 against the load of the flat spring 44. Such pivotal movement of the lever will permit the previously tilted poppet valve 28 to be fully seated on its valve seat and to function as a check valve.

The several practical advantages which flow from the above-described mechanism are believed to be obvious and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of components without departing from the spirit of the invention.

Having thus described the various features of the invention, what we claim as new and desire to secure by Letters Patent is:

We claim:

1. A fluid pressure distributing device comprising a housing having inlet port means, vent port means, and outlet port means, passage means for communicating said port means with each other, first valve means located in said passage means, said first valve means having a first position for preventing communication between said inlet and outlet port means while permitting communication between said outlet and vent port means and a second position for permitting communication between said inlet and outlet port means while preventing communication between said outlet and vent port means, second valve means located in said passage means between said first valve means and said outlet port means, said second valve means having a first position for permitting bidirectional flow between said vent and outlet port means when said first valve means is in its first position and having a second position for permitting only unidirectional flow between said inlet and outlet port means when said first valve means is in its second position, means operatively connecting said first valve means to said second valve means so that movement of said first valve means from its first to its second position will cause movement of said second valve means from its first to its second position, and actuating means for causing movement thereof from said first to said second position.

2. The structure, as defined in claim 1, wherein said first valve means includes a main valve for controlling flow through said inlet port means, vent valve means for controlling flow through said vent port means, and linking means operatively connected to said main and vent valve for providing concomitant movement thereof.

3. The structure, as defined in claim 2, wherein said actuating means is operatively connected to said vent valve.

4. The structure, as defined in claim 3, wherein said actuating means includes a rotatable cam plate fixedly connected at its axis of rotation to said housing and having an eccentric groove with detent means at the ends thereof located in the face thereof, and a follower member located in said groove and fixedly connected to said vent valve for causing movement thereof.

5. The structure, as defined in claim 4, wherein said groove is formed so as to provide said cam with an initial predetermined nonactuating range of rotation and a subsequent predetermined actuating range of rotation.

6. A fluid pressure distributing device comprising a housing having an inlet port, a vent port, and two outlet ports, first passage means for communicating said inlet port with said vent port, normally closed main valve means located at one end of said first passage means, normally open vent valve means located at the other end of said first passage means for controlling flow therethrough, second passage means for communicating said first passage means with said outlet ports, linking means operatively connected to said main and vent valve means for providing concomitant movement thereof, check valve means located in one of said outlet ports, said check valve means having an open position for permitting communication between said outlet ports and a pressure responsive closed position for preventing communication between said outlet ports, lever means operatively connected to said linking means and said check valve means for maintaining said check valve means in said open position when said main valve means is in a closed position and said vent valve means is in an open position and for permitting said check valve means to move to said pressure responsive closed position when said main valve means is in an open position and said vent valve means is in a closed position, and actuating means operatively connected to one of said valve means for moving said main valve means to its open position, said vent valve means to its closed position, and said check valve means to its pressure responsive closed position.

7. The structure, as defined, in claim 6, wherein said vent valve means includes an axially movable plunger member located in a bore of said housing, and said actuating means includes a rotatable cam plate fixedly connected at its axis of rotation to said housing, said cam plate having an eccentric groove located in one face thereof with detent means at the ends thereof, and a cross-pin follower having one end thereof located in said groove and the other end thereof fixed to said plunger for causing axial movement of said plunger upon rotation of said cam plate.

8. The structure, as defined in claim 7, wherein said groove is formed so as to provide said cam with an initial predetermined nonactuating range of rotation and a subsequent predetermined actuating range of rotation.

9. The structure, as defined in claim 6, wherein said check valve means includes a tilt-type spring loaded poppet valve which is seatable in a valve seat formed in said outlet port, said poppet valve having a stem extending therefrom, and said lever means includes a lever which is pivotally connected to said housing and has one end thereof abutting said valve stem and the other end thereof connected to said linking means, said lever having a first position which tilts said poppet valve off its valve seat to an open position and a second position which permits said poppet valve to be fully seated on its valve seat and to function as a check valve.

10. The structure, as defined in claim 9, wherein said lever is spring loaded so as to urge it towards its first position.